US008683030B2

(12) United States Patent
Paramasivam et al.

(10) Patent No.: US 8,683,030 B2
(45) Date of Patent: *Mar. 25, 2014

(54) ROUTING OF POOLED MESSAGES VIA AN INTERMEDIARY

(71) Applicant: Microsoft Corporation, Redmond, WA (US)

(72) Inventors: Kartik Paramasivam, Redmond, WA (US); James E. Johnson, Bellevue, WA (US); Nicholas Alexander Allen, Redmond, WA (US); John Anthony Taylor, Bellevue, WA (US); Margaret J. Drollinger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/655,162

(22) Filed: Oct. 18, 2012

(65) Prior Publication Data

US 2013/0046877 A1 Feb. 21, 2013

Related U.S. Application Data

(63) Continuation of application No. 12/484,741, filed on Jun. 15, 2009, now Pat. No. 8,301,706.

(51) Int. Cl.
*G06F 15/173* (2006.01)

(52) U.S. Cl.
USPC ............ 709/223; 709/206; 709/217; 718/105

(58) Field of Classification Search
USPC ................. 709/203, 217, 219, 225, 223, 206; 718/105; 370/401, 252
See application file for complete search history.

(56) References Cited

U.S. PATENT DOCUMENTS

| 5,339,392 A | 8/1994 | Risberg |
| 5,371,889 A | 12/1994 | Klein |

(Continued)

FOREIGN PATENT DOCUMENTS

| EP | 1198106 | 4/2002 |
| EP | 1873643 A1 | 1/2008 |
| WO | WO2006118529 | 11/2006 |

OTHER PUBLICATIONS

Ceponiene, Lina, et al., "Transformation from Requirements to Design for Service Oriented Information Systems", ADBIS Research Communications, 2005, pp. 164-177.

(Continued)

*Primary Examiner* — El Hadji Sall
(74) *Attorney, Agent, or Firm* — Workman Nydegger

(57) ABSTRACT

Message intermediation for multiple service instances, while allowing the service instance to control whether messages are processed under a transaction. The message intermediator chooses to dispatch messages among different backend service instances based on any routing rules. The message intermediator performs a peek-lock of message from a forward-end queue, and assigns the message to a service instance. The message is provided into a backward-end queue specific to the assigned service instance. The service instance may then process the message, perhaps under a transaction created at the service instance. Upon completion of processing, the message is deleted in the back-end queue, which causes the forward-end queue to delete the message under the same transaction created by the service instance. Whether or not this deletion at the forward-end is committed or rolled back depends on whether the transaction created at the service instance is committed or rolled back.

25 Claims, 5 Drawing Sheets

(56) References Cited

U.S. PATENT DOCUMENTS

| | | | |
|---|---|---|---|
| 5,452,445 A | 9/1995 | Hallmark et al. | |
| 5,465,328 A | 11/1995 | Dievendorff | |
| 5,592,622 A | 1/1997 | Isfeld | |
| 5,802,310 A | 9/1998 | Rajaraman | |
| 5,913,213 A | 6/1999 | Wikstrom | |
| 5,924,097 A | 7/1999 | Hll et al. | |
| 5,974,442 A | 10/1999 | Adams | |
| 6,185,197 B1 | 2/2001 | Cheung Yeung | |
| 6,263,360 B1 | 7/2001 | Arnold | |
| 6,332,150 B1 | 12/2001 | Khan et al. | |
| 6,353,834 B1 | 3/2002 | Wong | |
| 6,425,017 B1 | 7/2002 | Dievendorff et al. | |
| 6,463,480 B2 | 10/2002 | Kikuchi | |
| 6,484,196 B1 | 11/2002 | Maurille | |
| 6,609,178 B1 | 8/2003 | Ofer | |
| 6,687,735 B1* | 2/2004 | Logston et al. | 709/203 |
| 6,748,583 B2 | 6/2004 | Aizenbud-Reshef et al. | |
| 6,817,018 B1 | 11/2004 | Clarke et al. | |
| 6,845,230 B2 | 1/2005 | Syed | |
| 6,848,108 B1 | 1/2005 | Caron | |
| 6,848,109 B1 | 1/2005 | Kühn | |
| 6,853,617 B2 | 2/2005 | Watson et al. | |
| 6,886,041 B2 | 4/2005 | Messinger | |
| 6,886,169 B2 | 4/2005 | Wei | |
| 6,968,395 B1 | 11/2005 | Lee | |
| 6,971,001 B1 | 11/2005 | Rolfs | |
| 6,983,322 B1 | 1/2006 | Tripp et al. | |
| 7,068,634 B2 | 6/2006 | Vanttinen | |
| 7,111,001 B2 | 9/2006 | Harris | |
| 7,149,976 B2 | 12/2006 | Yagati | |
| 7,154,901 B2 | 12/2006 | Chava et al. | |
| 7,200,676 B2 | 4/2007 | Christensen et al. | |
| 7,240,350 B1 | 7/2007 | Eberhard | |
| 7,318,109 B2 | 1/2008 | Liscano et al. | |
| 7,330,860 B2 | 2/2008 | Adiba | |
| 7,370,329 B2 | 5/2008 | Kumar | |
| 7,380,135 B2 | 5/2008 | Nishimoto et al. | |
| 7,392,057 B2 | 6/2008 | Lee | |
| 7,409,428 B1 | 8/2008 | Brabec | |
| 7,434,225 B2 | 10/2008 | Groetzner et al. | |
| 7,527,558 B2 | 5/2009 | Lavoie | |
| 7,543,181 B2 | 6/2009 | Buxton | |
| 7,565,451 B2 | 7/2009 | Cabrera | |
| 7,631,108 B2 | 12/2009 | Kesselman | |
| 7,640,249 B2 | 12/2009 | Smits | |
| 7,711,788 B2* | 5/2010 | Lev Ran et al. | 709/213 |
| 7,743,109 B2* | 6/2010 | Kaminsky et al. | 709/214 |
| 7,783,610 B2* | 8/2010 | Lin et al. | 707/689 |
| 7,802,263 B2 | 9/2010 | Fuchs | |
| 7,865,684 B2 | 1/2011 | Michaylov | |
| 7,937,364 B1 | 5/2011 | Chandrasekaran | |
| 7,945,631 B2* | 5/2011 | Chkodrov et al. | 709/206 |
| 8,095,935 B2* | 1/2012 | Paramasivam et al. | 718/105 |
| 2001/0023482 A1 | 9/2001 | Wray | |
| 2002/0116538 A1 | 8/2002 | Chen | |
| 2004/0186918 A1 | 9/2004 | Lonnfors | |
| 2004/0268357 A1 | 12/2004 | Joy et al. | |
| 2005/0147057 A1 | 7/2005 | LaDue | |
| 2005/0195820 A1 | 9/2005 | Betts | |
| 2005/0219617 A1 | 10/2005 | Mochizuki et al. | |
| 2005/0278270 A1 | 12/2005 | Carr | |
| 2006/0053163 A1 | 3/2006 | Liu et al. | |
| 2006/0080579 A1 | 4/2006 | Rothman et al. | |
| 2006/0085797 A1 | 4/2006 | Connelly | |
| 2006/0101064 A1 | 5/2006 | Strong | |
| 2006/0136367 A1 | 6/2006 | Todd | |
| 2006/0146879 A1 | 7/2006 | Anthias et al. | |
| 2006/0149865 A1 | 7/2006 | Kirstein | |
| 2006/0155862 A1 | 7/2006 | Kathi et al. | |
| 2006/0187902 A1 | 8/2006 | Birch et al. | |
| 2006/0230062 A1 | 10/2006 | Roy-Chowdhury et al. | |
| 2007/0005613 A1 | 1/2007 | Singh et al. | |
| 2007/0005640 A1 | 1/2007 | Klein | |
| 2007/0027928 A1 | 2/2007 | Majumdar | |
| 2007/0109592 A1 | 5/2007 | Parvathaneni et al. | |
| 2008/0086567 A1 | 4/2008 | Langen et al. | |
| 2008/0187004 A1 | 8/2008 | Johnson | |
| 2008/0288954 A1 | 11/2008 | Fuchs | |
| 2009/0132671 A1* | 5/2009 | Chkodrov et al. | 709/206 |
| 2009/0133036 A1 | 5/2009 | Allen | |
| 2009/0133037 A1 | 5/2009 | Allen | |
| 2009/0199208 A1 | 8/2009 | Pinto | |
| 2009/0216793 A1 | 8/2009 | Szyperski | |
| 2009/0222794 A1 | 9/2009 | Pinto | |
| 2009/0282396 A1 | 11/2009 | Boyer | |
| 2009/0319911 A1 | 12/2009 | McCann et al. | |
| 2009/0320044 A1* | 12/2009 | Dar et al. | 719/314 |
| 2010/0107177 A1 | 4/2010 | Pinto | |
| 2011/0231702 A1 | 9/2011 | Allen | |
| 2011/0264738 A1 | 10/2011 | Allen | |

OTHER PUBLICATIONS

Arbab, Farhad, "The Influence of Coordination on Program Structure", 1997 IEEE, pp. 300-309.
Zambonelli, Franco, et al., "Programmable Coordination Infrastructures for Mobility", 2001, 5 pages.
Arbab, Farhad, et al., "Coordination through Channel Composition", 2002, LNCS 2315, pp. 22-39.
Castro, Eva M., et al., Departamento de Ingenieria de Sistemas Telematicos Universidad Politecnica de Madrid DIT.UPM, "Reliable Multicast for Coordination of Cooperative Applications", http://jungla.dit.upm.es/~ecastro/ReliableMulticast/rmulticast.html, 1999, 1 page.
Guermouche, Abdou, et al., "A study of various load information exchange mechanisms for a distributed application using dynamic scheduling" Jan. 2005, 16 pages.
Albrecht, Jeannie, et al., "Remote Control: Distributed Application Configuration, Management, and Visualization with Plush", 2007, 16 pages.
Aaron Skonnard, Pluralsight, "A Developer's Introduction to Windows Communication Foundation (WCF).Net 4 Beta 1", Jul. 2009, 57 pages.
Bhatti, Nina T., et al., "A System for Constructing Configurable High-Level Protocols", 1995, 13 pages.
Lee, Whay Sing, et al., "An Efficient, Protected Message Interface", Nov. 1998, pp. 69-75.
Bhoedjang, Raoul A.F., "Communication Architectures for Parallel-Programming Systems", Jun. 2000, 282 pages.
Nodine, Marian, et al., "Task Coordination Paradigms for Information Agents", Lecture Notes in Computer Science; vol. 1986, Proceedings of the 7th International Workshop on Intelligent Agents VII. Agent Theories Architectures and Languages, Year of Publication: 2000, 15 pages.
Onion, Fritz, "State Management in ASP.NET", informIT, May 30, 2003, 5 pages.
Allen, Nicholas, "Nicholas Allen's Indigo Blog—Future of Queuing", Windows Communication Foundation from the Inside, Dec. 1, 2008, 2 pages.
Load-Balancing for MySQL http://diku.dk/publikationer/tekniske.rapporter/rapporter/03-1.pdf (67 pages) Fall 2003—Dennis haney & Klaus S. Madsen.
Planning for Reliability and High Availability http://msdn.microsoft.com/en-us/library/ms942932.aspx (32 pages) 2008—Microsoft Coorporation. [Retrieved from the internet May 21, 2008].
Distributed Computing with BEA WebLogic Server http://www-db.cs.wisc.edu/cidr/cidr2003/program/p26.pdf (11 pages) Jan. 5-8, 2003—Dean Jacobs—BEA Systems.
On Affinity Based Routing in Multi-System Data Sharing http://www.vldb.org/conf/1986/P249.PDF (8 pages) Aug. 1986—Phillip S. Yu, Douglas W. Cornell, daniel M. Dias and Balakrishna R Iyler.
U.S. Appl. No. 12/019,041, Oct. 5, 2011, Office Action.
U.S. Appl. No. 12/018,401, Oct. 13, 2011, Office Action.
U.S. Appl. No. 12/767,091, Jan. 18, 2012, Notice of Allowance.
U.S. Appl. No. 12/019,041, Mar. 12, 2012, Office Action.
U.S. Appl. No. 12/018,401, Apr. 5, 2012, Office Action.
U.S. Appl. No. 12/767,091, Jun. 25, 2012, Notice of Allowance.
U.S. Appl. No. 12/727,066, Jun. 12, 2012, Office Action.
U.S. Appl. No. 12/018,401, Sep. 28, 2012, Office Action.

(56) References Cited

OTHER PUBLICATIONS

U.S. Appl. No. 12/019,041, Oct. 3, 2012, Office Action.
U.S. Appl. No. 12/605,236, Oct. 17, 2012, Office Action.
U.S. Appl. No. 12/727,066, Nov. 2, 2012, Notice of Allowance.
U.S. Appl. No. 12/484,741, Jun. 27, 2012, Notice of Allowance.
Notice of Allowance mailed Jan. 4, 2013 cited in U.S. Appl. No. 12/727,066.
Notice of Allowance dated May 20, 2013 cited in U.S. Appl. No. 12/727,066.
Office Action dated Mar. 28, 2013 cited in U.S. Appl. No. 12/605,236.
Office Action dated Apr. 4, 2013 cited in U.S. Appl. No. 12/019,041.
Notice of Allowance dated Apr. 10, 2013 cited in U.S. Appl. No. 12/018,401.

* cited by examiner

ROUTING OF POOLED MESSAGES VIA AN INTERMEDIARY

CROSS-REFERENCE TO RELATED APPLICATIONS

This application is a continuation of U.S. patent application Ser. No. 12/484,741 filed on Jun. 15, 2009 and entitled "ROUTING OF POOLED MESSAGES VIA AN INTERMEDIARY," which application is expressly incorporated herein by reference in its entirety.

BACKGROUND

A load balancer is often used to distribute incoming messages amongst multiple service instances. A "stateful" service is a service that tracks state as messages are received. Accordingly, for load balancers that distribute messages to stateful services, the load balancer may "affinitize" messages belonging to the same state to the same service instance. On the other hand, for all new messages which are not yet associated with a service instance, the load balancer need not be concerned with affinitization, but can distributed the messages to whichever backend machine is deemed most available.

Affinitization can be advantageous in services where once a service instance begins to process a particular client, that service instance cannot be moved to other machines in the server farm. Basically the state of the service instance could be stored in memory of the local machine and hence cannot be moved to other machines in the farm. As a result, such services might use message affinitization for them to work when deployed on a scaled out server farm.

In other cases, the service deployed on the server farm shares a common state store. And as a result of various other factors including the implementation technology of the service, it is possible that the service instance can be brought back up on a different machine from where it was originally started. Even then, however, if the load balancer continues to pick the same backend machine for processing messages belonging to the same service instance, then it would provide a substantial performance improvement as opposed to spraying messages to various backend machines.

BRIEF SUMMARY

Embodiments described herein related to the use of a message forwarding intermediary for multiple service instances, while allowing the service instance to control whether or not messages are processed under a transaction. Optionally, the use of a message forwarding intermediary may also perform stateful-session based affinitization of the messages, such that message that belong to the same stateful-session tend to get processed by the same service instance.

In one embodiment, the message forwarding intermediary performs a peek-lock of a message from the forward-end peek-lock enabled message pool, an example of which being a queue. The message forwarding intermediary evaluates the message to identify that, of a plurality of service instances, a particular service instance is to process the message. This identification may involve, as previously mentioned, affinitization of the message to the particular service instance based on the service instance's processing of message(s) from the same stateful session as the message being currently evaluated. The message forwarding intermediary dispatches the message towards a backward-end message pool corresponding to the particular service instance such that the message is ultimately received into the backward-end message pool.

In one embodiment, the service instance responds by performing a peek-lock of a message from the backward-end peek-lock enabled message pool. The service instance processes the message, perhaps under a transaction. Upon successful processing of the message, the service instance performs a delete of the message in the backward-end message pool, or otherwise indicates that processing is complete. The backward-end message pool responds by causing the forward-end peek-lock enabled pool to perform a delete of the message in the forward-end peek-lock enabled message pool under the transaction created at the particular service instance.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a message forwarding intermediary intermediates messages for multiple service instances, while allowing the service instance to control whether or not messages are processed under a transaction. Optionally, the message forwarding intermediary may also perform stateful-session based affinitization of the messages, such that messages that belong to the same stateful-session tend to get processed by the same service instance. First, some introductory discussion regarding message processors will be described with respect to FIGS. 1A and 1B. Then, various embodiments of the messaging intermediation will be described with respect to FIGS. 2 through 5.

Figure 1A:
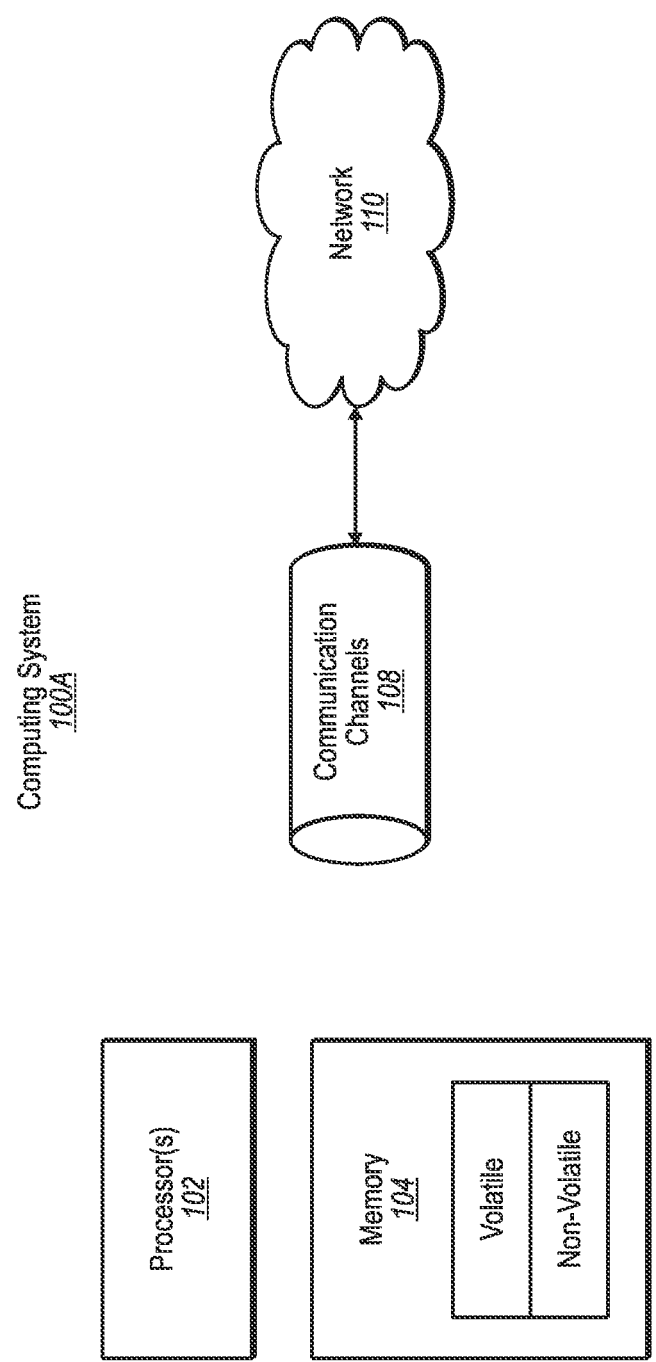
FIG. 1A illustrates one example of a message processor in the form of a computing system.

A message processor may be implemented in software or hardware, or a combination thereof. FIG. 1A illustrates a computing system, which may implement a message processor in software. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems. That said, a "message processor" is not even limited to use in a computing system at all.

FIG. 1A illustrates a message processor in the form of a computing system 100A. In its most basic configuration, a computing system 100A typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "module" or "component" can refer to software objects or routines that execute on the computing system. The different components, modules, engines, and services described herein may be implemented as objects or processes that execute on the computing system (e.g., as separate threads). However, as will be described further below with respect to FIG. 1B, the message processor may be implemented as a state machine as well, perhaps even fully in hardware.

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100A.

Computing system 100A may also contain communication channels 108 that allow the computing system 100A to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 1B:
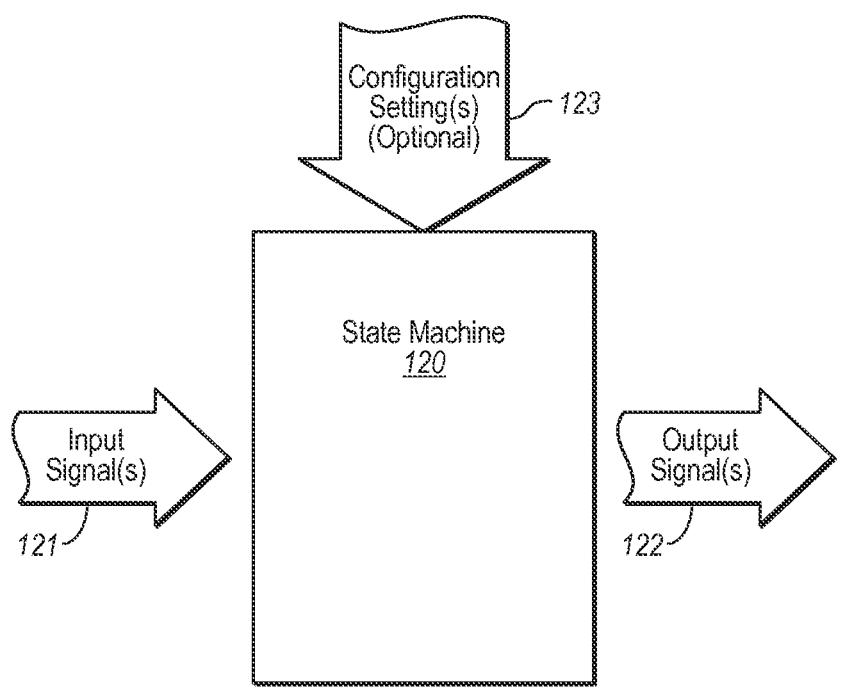
FIG. 1B illustrates another example of a message processor in the form of a state machine.

FIG. 1B illustrates a message processor in the form of a state machine 120. A state machine 120 may be implemented entirely in hardware, although that need not be the case. The state machine 120 receives input signal(s) 121, and deterministically generates output signal(s) 122. Optionally, the deterministic function may depend on one or more optional configuration settings 123. In one embodiment, the state machine 120 may be implemented using logic gates and potentially other circuit components such as perhaps registers and clocks. When implemented as a message processor, the state machine 120 may perform the message dispatch described herein.

Now that example message processors have been described, FIG. 2 will now be described, which illustrates a particular messaging processing environment 200. The various illustrated components may be implemented in software or hardware. For instance, if a given component is implemented in software, the computing system 100A of FIG. 1A may cause the component to be created and operated by the processor(s) 102 executing computer-executable instructions from the memory 104. If implemented in hardware, the component may be a computing system or device such as that illustrated with respect to FIG. 1B.

Figure 2:
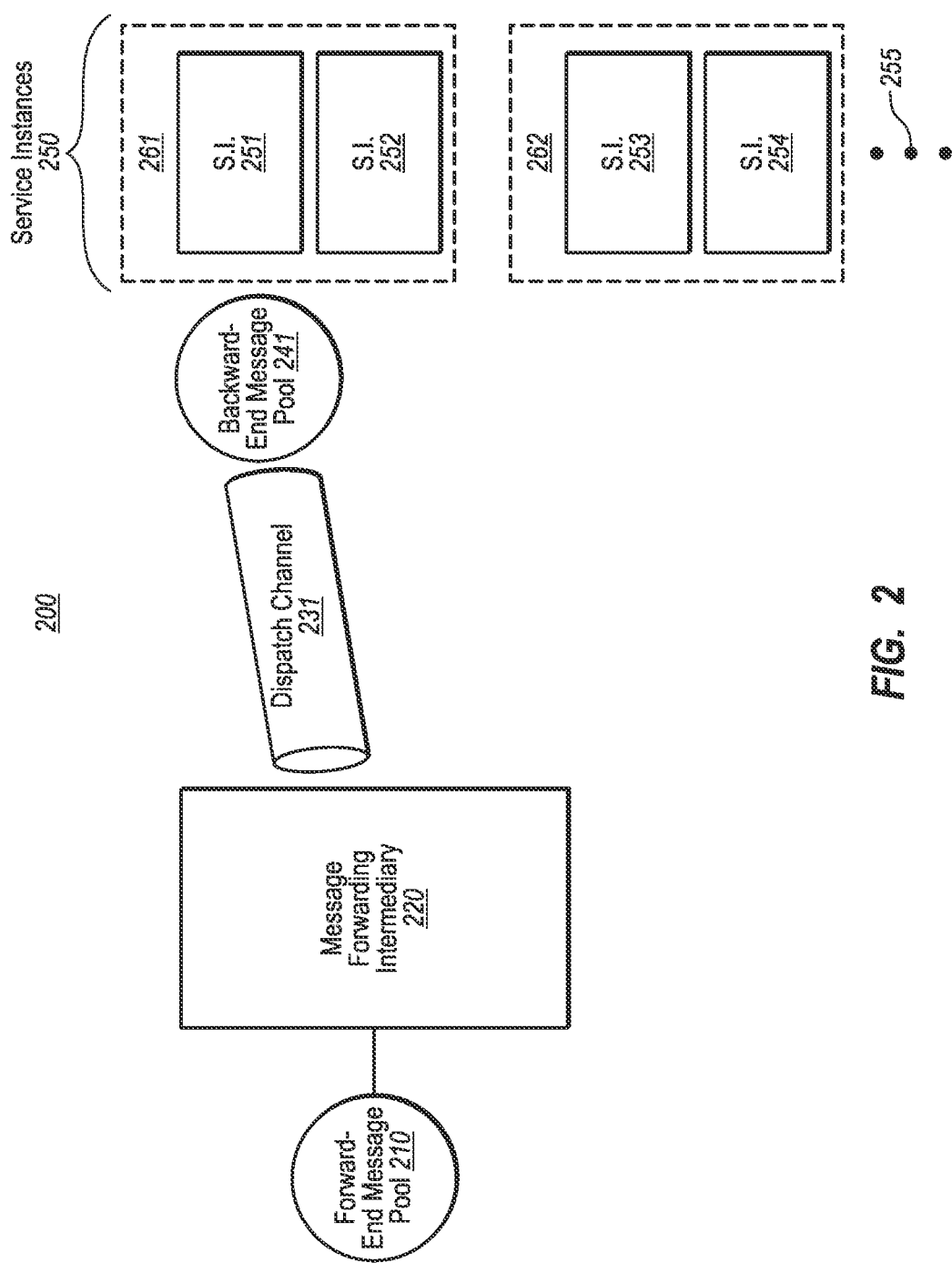
FIG. 2 illustrates a message forwarding environment in which in-bound messages may be intermediated amongst a plurality of service instances.

FIG. 2 illustrates an environment 200 in which message forwarding is performed while allowing the service instance that is fed by the message forwarder to actually initiate a transaction.

The environment 200 includes a forward-end message pool 210. The message pool 210 is "peek-lock enabled". In this description and in the claims, a message pool is "peek-lock enabled" if it can participate in a "peek-lock" coordination pattern on at least one message (and potentially all messages) in the message pool. A message pool can participate in a "peek-lock" coordination pattern if it can perform a "peek" and a "lock" operation.

The peek operation (also referred to herein as a "non-destructive read") means that the message pool 1) can receive requests for a message in the pool from a requestor, and 2) responds to the request by providing a view on the contents of the requested message to the requestor, without deleting the requested message from the message pool.

The "lock" operation means that the message pool responds to the request by locking the requested message in the message pool for exclusive access by the requestor until the lock is released. When the message is locked in the message pool, another instance of the message cannot be read again from the message pool for processing before the lock is released. In fact, a locked message in the message pool might not even be perceived by other computing entities other than the requester. Rather, the message pool has granted the requestor an exclusive right to determine the disposition of the message. In a preferred embodiment, that exclusive right is granted with a limited duration. Such a limited duration exclusive right on the lock is referred to herein as a "lease". As examples, the limited duration might be a fixed interval, or perhaps the lifetime of the receiver's process.

Upon successful processing of the read instance of the message, the message may be deleted from the message pool. For instance, the requestor may choose to convert the non-destructive read performed during the peek operation, into a destructive read (i.e., a delete), thereby resulting in the message begin deleted from the message pool. The requestor might further choose to perform the delete along with other work via a transaction. If that is the case, the transaction coordinates the destructive read with other activities in the system.

Upon unsuccessful processing of the read instance of the message, the lock of the message may be released (i.e., the message may be unlocked) so that the message may be once again read from the message pool for processing. This may be accomplished, for example, by the requestor revoking the grant of the exclusive right to access the message (also referred to herein as an "unlock" operation). Alternatively, the expiration of the lease would also cause the grant of the exclusive right of the requestor to be revoked. Thus, the message becomes unlocked in the message pool, allowing other processes to access the message.

The term "peek-lock" need not be the actual terms (even in source code) that are used when making the commands used to perform the peek-lock operation.

There are two message pools 210 and 241 expressly illustrated in FIG. 2. The message pools may be any source of messages whether present on the same machine, or distributed over a network. In one embodiment, either or both of the message pools 210 and 241 may be a queue such as, for example, an MSMQ instance. The message pools 210 and 241 may even be the same type of message pool or queue. In one embodiment, the backward-end message pool 241 is also peek-lock enabled.

The message pool 210 is designated in FIG. 2 as "forward-end" merely to distinguish the message pool 210 from a backward-end message pool 241 that will be discussed further herein, and to describe the relative positions of the message pools 210 and 241 only. The message pool 210 is not designated as "front-end" since there might be other message pools (not illustrated) in front of the message pool 210 that serve to directly or indirectly feed messages into the message pool. Likewise, the backward-end message pool 241 is termed "backward-end", rather than "back-end" since there may be other message pools (not illustrated) in back of the message pool 241 that the message pool 241 may directly or indirectly provide messages into as part of the processing of the message by a service instance 251.

The environment 200 also includes a message forwarding intermediary 220 and one or more service instances 250. The service instances 250 are illustrated as including four service instances 251 through 254. However, the ellipses 255 represents that there may be other numbers of service instances as well, even as low as one, and perhaps zero at some points in time, or there may be many more instances such as thousands, or even millions of service instances. The number of service instances 250 is not important to the broader principles described herein. The ellipses 255 also represents that the number of services instances may increase (as new service instances are instantiated), or decrease (as service instances are terminated).

In one embodiment, the service instances are running on different machines. As an example only, suppose for purposes of discussion only, that service instance 251 and 252 run on a machine 261, and service instances 253 and 254 run on a machine 262.

The message forwarding intermediary 220 receives messages (i.e., a view of the contents of the now locked message) from the forward-end message pool 210, decides which of the service instances 251 through 254 is to process the message, and dispatches the message contents towards the appropriate service instance. For instance, the remaining example refers to a case in which the message forwarding intermediary 220 dispatches message contents towards the service instance 251. In that case, the message contents is dispatched through a dispatch channel 231 that provides the message contents from the message forwarding intermediary 220 into the backward-end message pool 241. The delivery mechanism for dispatching messages from the message forwarding intermediary 220 into the other service instances 252 through 254 is not illustrated or described herein, except to say that each delivery mechanism may, but not need, be the same as that described for the service instance 251.

In one embodiment, the message forwarding intermediary 220 acts as a load balancer in deciding which of the service instances to which to dispatch the message contents. For instance, the message forwarding intermediary 220 may identify a number of candidate service instances that are capable of processing the message, and select from only one of those multiple instances based on the respective loads of the candidate service instances.

As previously mentioned, the dispatch channel 231 allows for messages to be communicated into the backward-end message pool 241. This may be accomplished, for example, using any protocol. However, in one embodiment, the communication protocol is a two-way communication protocol. An example of this is Transmission Control Protocol (TCP) which uses the Internet Protocol (IP) (also called "TCP over IP"). Thus, incoming message are received one way into the forward-end message pool 210, following which there may be a two way communication communicating the messages from the message forwarding intermediary 220 into the backward-end message pool 241. Finally, the backward-end message pool 241 may expose its services to the service instance 251 in the same way that it would had the backward-end message pool received the messages directly one way. Thus, in this embodiment, the service instance 251 may interface with the backward-end message pool 241 in the same way as it might interface with the forward-end message pool 210 had the message forwarding intermediary 220 been absent, and the service instance 251 coupled directly to the forward-end message pool 210.

Figure 3:
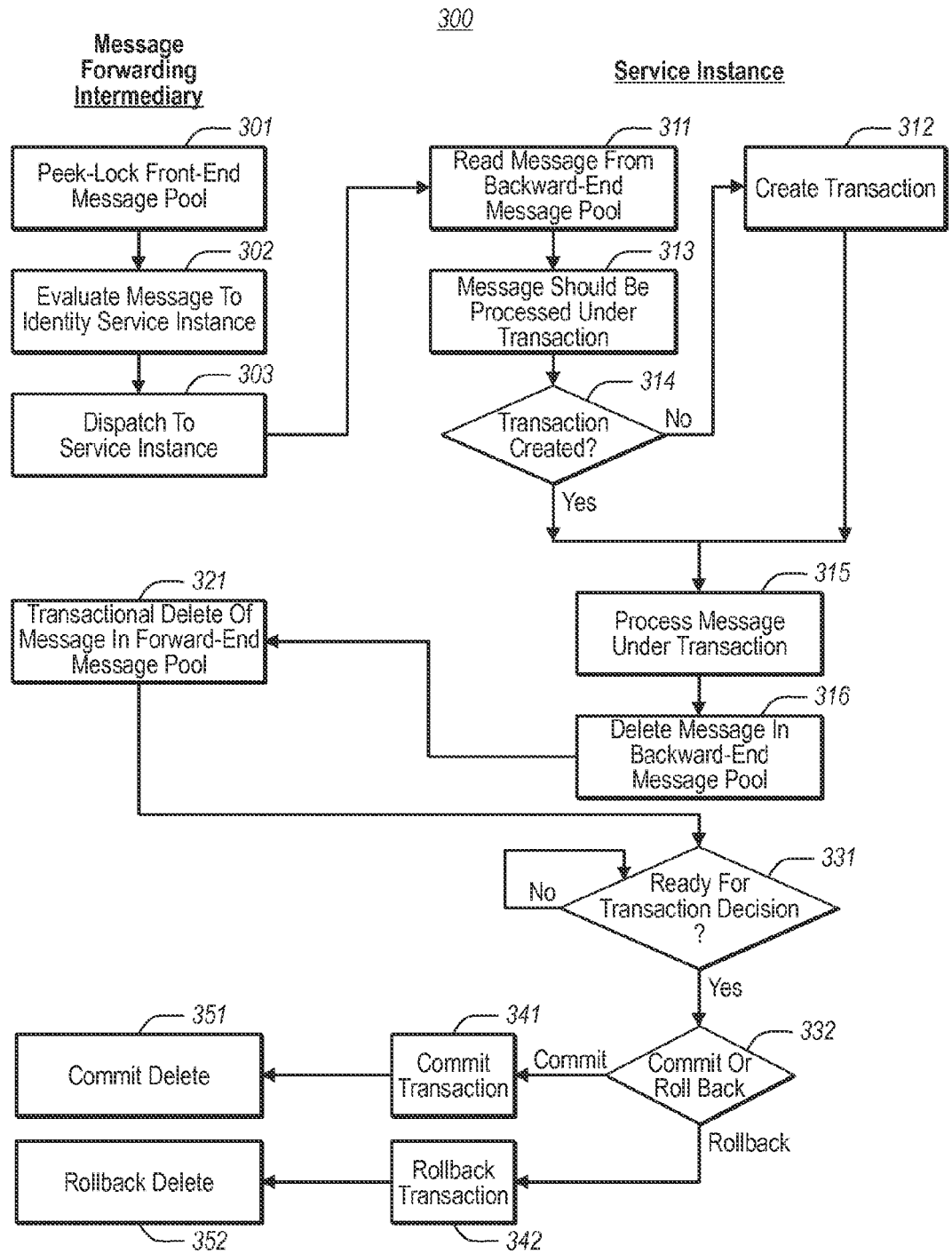
FIG. 3 illustrates a flowchart of a method for processing messages in the message forwarding environment of FIG. 2.

FIG. 3 illustrates a flowchart of a method 300 for processing a message in a transaction in a message forwarding environment. Some of the acts described with respect to FIG. 3 are performed by the message forwarding intermediary 220 as symbolized by their represented in the left half of FIG. 3 associated with header "Message Forwarding Intermediary". Others of the acts described with respect to FIG. 3 are performed by the service instance 251 as symbolized by their representation in the right half of FIG. 3 associated with the header "Service Instance".

The message forwarding intermediary performs a peek-lock (act 301) of a message from the forward-end peek-lock enabled message pool. The message may correspond to a stateful service or session. Recall that in the peek-lock coordination pattern, the message forwarding intermediary 220 requests a message from the forward-end message pool 210. If the message is locked, the request is refused. However, if the message is not locked, the forward-end message pool 210 provides a view on the contents of the message to the message forwarding intermediary 220. The message itself remains in the message pool. In fact, the message is locked in the message pool as part of the peek-lock coordination pattern, so that the message intermediary has exclusive access to the locked message. Accordingly, while the message is locked, another instance of the message is prevented from being dispatched unless and until the lock is released.

The message forwarding intermediary 220 evaluates the message contents (act 302). Based on the message state and/or other circumstances, the message forwarding intermediary 220 will decide a service instance that the message contents should be sent to. In the example that will be described hereinafter, that particular service instance is the service instance 251. In one embodiment, the message forwarding intermediary 220 performs a session-based affinitization load balancing algorithm. As an example, for certain types of services, once the service instance begins to process a particular client or group of messages that belong to the same session, that service instance cannot be moved to other machines in the server farm.

Perhaps the state of the service instance could be stored in memory of the machine and hence cannot be moved to other machines in the farm. In the example, of FIG. 2, perhaps the message is from a client that has already sent a message that happen to have processed by the service instance 251, and perhaps the service instance 251 cannot be readily moved to another machine. In that case, the message and other messages from that client (at least temporarily) may be affinitized to the service instance 251.

In other cases, the service instances deployed on the farm, share a common state store. Furthermore, suppose as a result of various other factors including the implementation technology of the service, it is possible that the service instance can be brought back up on a different machine from where it was originally started. Even then, for potentially improved performance, the message forwarding intermediary may continue to pick the same machine for processing messages belonging to the same service instance.

If there is not yet a service instance that is ready to service the message, the message forwarding intermediary may cause a service instance to be initiated on an appropriate machine. The message forwarding intermediary may keep track of the health of the various servers in a server farm, and distribute the message appropriately. In evaluating the appropriate service instance to dispatch the message to, the message forwarding intermediary might also identify the appropriate server machine to dispatch the message to in the case where there is more than one available server.

The message forwarding intermediary then dispatches (act 303) the message contents towards a backward-end peek-lock enabled message pool 241 corresponding to the particular service instance 251. This is done such that the message is ultimately received into the backward-end peek-lock enabled message pool 241. In other words, although the message forwarding intermediary may not have complete control over the dispatch channel 231, the message forwarding intermediary does inject the message contents into the dispatch channel 231. In one embodiment, the dispatch channel 231 comprises a TCP channel that communicates the message using transmission control protocol. TCP allows the message to be reliably communicated between the message forwarding intermediary 220 and the backward-end message pool 241. The message is then available in the backward-end message pool 241 for the service instance 251. In the case where the backward-end message pool 241 is a queue, there may be some logic that converts the TCP message into a form that may be inserted into the backward-end message pool 241.

The service instance 251 then reads the message from the backward-end message pool 241 (act 311). For instance, this might be accomplished using a peek-lock, although not required, and may be the same type of peek-lock that was performed by the message forwarding intermediary 220 on the forward-end message pool 210.

Possibly, but not necessarily, prior to the receipt of this message, the service instance may have created a transaction under which the message will be processed (act 312). For instance, this transaction might have been previously created due to the processing a prior message under the transaction, or perhaps due to some other preliminary setup of the transaction. The service instance determines (act 313) that the message should be processed under the transaction created at the service instance. If the transaction has already been created (Yes in decision block 314), then the service instance processes the message under this transaction (act 315). Otherwise, (No in decision block 314), the transaction is created (act 312) in preparation for performing the message under the transaction (act 315). Alternatively, the message may be processed outside of a transaction.

Figure 4:
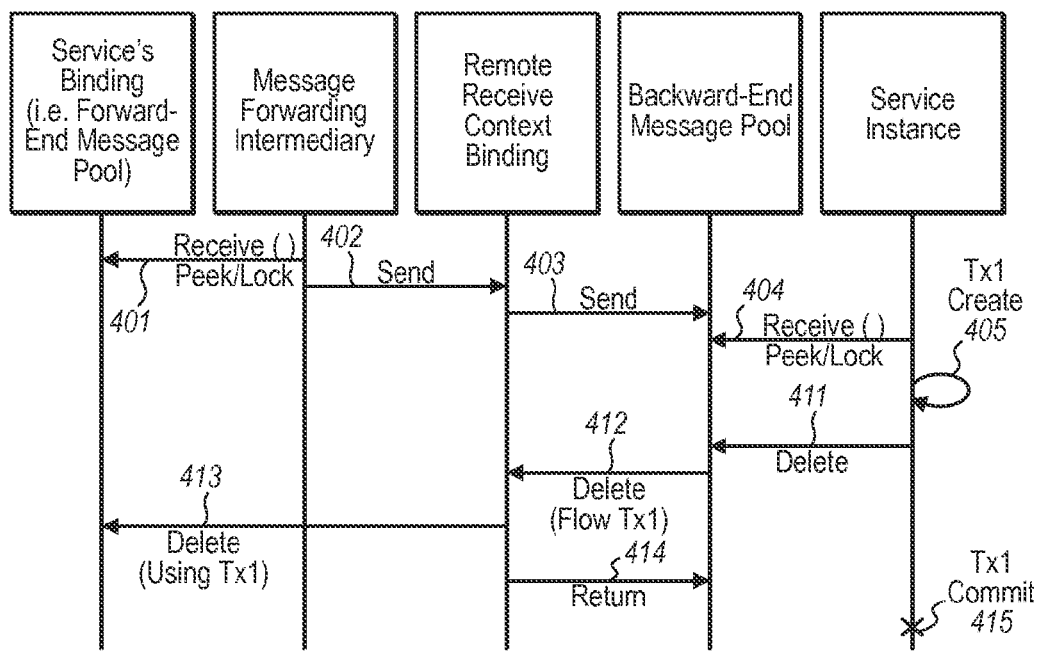
FIG. 4 illustrates an example processing flow in the case of normal processing of the message.
Figure 5:
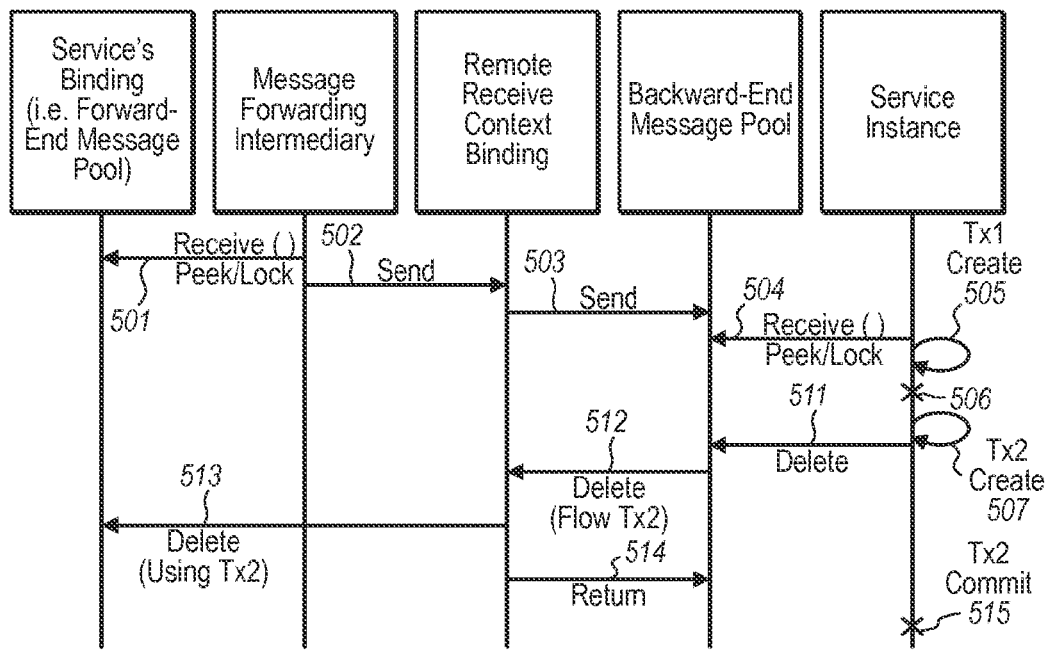
FIG. 5 illustrates an example processing flock in the case of error handling of the message.

FIG. 4 illustrates an example message flow associated with normal processing of the message, while FIG. 5 illustrates an example message flow associated with error handling processing of the message. Up until this point, the message flow has been the same regardless of whether the message is normally processed by the service instance, or whether an error occurred in processing of the message, thereby resulting in error handling of the message.

Specifically, arrows 401 and 501 represent the message forwarding intermediary acquiring the message from the forward-end message processor. Arrows 402 and 502 represent that message forwarding intermediary dispatching the message into the dispatch channel. Arrows 403 and 503 represent the message being received into the backward-end message pool. Arrows 404 and 504 represent the message being received by the service instance from the backward-end message processor. In the illustrated cases of FIGS. 4 and 5, the message is received into the service instance from the backward-end message pool through the use of a peek-lock operation. In FIG. 4, which shows normal processing, as represented by arrow 405, a transaction Tx1 is created, and the message is successful processed. In FIG. 5, which shows error handling, the process does begin the same way, in this embodiment. Specifically, the transaction Tx1 is created, and normal processing of the message is attempted as represented by arrow 505. However, in this case, the normal processing failed as represented by the symbol 506. At this stage, a second transaction Tx2 is created for purposes of performing error processing (as represented by arrow 507). In the remaining processing of FIGS. 4 and 5, the flows are similar, except that the normal processing of FIG. 4 deals with the first transaction Tx1 created for normal processing of the message, and FIG. 5 deals with the second transaction Tx2 created for error handling of the message.

Returning to FIG. 3, the remaining portions of FIG. 3 will be described with respect to the message flows of FIGS. 4 and 5. Upon successful processing of the message (in the case of FIG. 4), or upon completion of error handling processing (in the case of FIG. 5), the services instance performs a delete of the message in the backward-end peek-lock enabled message pool (act 316). Referring to FIG. 4, this is represented by the arrow 411 of FIG. 4, and the arrow 511 of FIG. 5. If the backward-end message pool were not a peek-lock enabled message pool, then perhaps some other message might indicate that processing of the message is completed. If the backward-end message pool 241 were transaction-enabled, the message pool 241 itself may perform the delete as part of the transaction. If the backward-end message pool 241 were not transaction-enabled, the service instance 251 may cause the message to be deleted from the backward-end message pool 241 once the service instance 251 determines that the transaction has resolved successfully.

This delete or completion operation causes the forward-end peek-lock enabled pool to perform a transactional delete of the message (act 321). This may occur by "flowing" the transaction created at the service instance back to the forward-end message pool. In the case of FIG. 4, the first transaction Tx1 is flowed back to the forward end message pool with the intermediation of the message forwarding intermediary as represented by the arrows 412 and 413. In the case of FIG. 5, the second transaction Tx2 is flowed back to the forward end message pool with the intermediation of the message forwarding intermediary as represented by the arrows 512 and 513. If the forward-end message pool 210 is transaction-enabled, the forward-end message pool 210 itself may perform the delete operation under the flowed transaction. However, if the forward-end message pool 210 is not transaction-enabled, the message forwarding intermediary 220 may not enlist in the flowed transaction. In that case, when the message forwarding intermediary 220 determines that the flowed transaction is resolved successfully, the message forwarding intermediary 220 deletes the message from the forward-end message pool 210 outside of the flowed transaction. Optionally, confirmation of the deletion of the message is returned as represented by arrows 414 and 514. There are a number of technologies that may be used in order to flow a transaction including that provided by WS-AtomicTransactions. However, even if the transaction is not flowed back from the service instance to the message forwarding intermediary, the service instance might otherwise signal the message forwarding intermediary of the results of the processing of the message. The message forwarding intermediary may then notify the forward-end queue of the disposition of the message based on the results of the service instance processing the message content. If, for example, the service instance did not process the message contents successfully, the forward-end message pool will unlock the message. If, on the other hand, the service instance did process the message contents successfully, the forward-end message pool will delete the message.

The service instance then determines whether or not to the service instance is ready to decide whether to commit or rollback the transaction (decision block 331). It is possible that even after the deletion operation in the forward-end message pool, the service instance still is not ready to make a transaction decision (No in decision block 331). For instance, there may be further messages that are expected to be performed as part of the transaction before a transaction decision can be made. In that case (No in decision block 331), the service instance waits until it is ready to make a decision on the transaction (Yes in decision block 331). This may perhaps only occur after the processing of one or more subsequent messages under the transaction.

If the service is ready to make the transaction decision (Yes in decision block 331), then the service instance decides whether or not to commit or rollback the transaction (decision block 332). If the decision is to commit (Commit in decision block 332), then the service instance commits the transaction (act 341), which causes the deletion of the message in the forward-end message processor to be committed 351). On the other hand, if the decision is to rollback (Rollback in decision block 332), the service instance rolls back the transaction (act 342) which is Tx1 in the case of FIG. 4 and Tx2 in the case of FIG. 5, which causes the deletion of the message in the forward-end message processor to be rolled back (act 352).

In one embodiment, to assist with a transaction in which multiple messages from the forward-end message pool 210 are to be processed under the same transaction, the above-described process may be repeated for each message. However, if the message forwarding intermediary determines that any of the messages were not processed successfully by the service instance, the message forwarding intermediary may treat all of the messages as though they were not processed successfully. Thus, for example, if six messages are to be processed under a transaction, and the message forwarding intermediary is signaled by the service instance that the first five messages were processed successfully, the message forwarding intermediary may abstain for the time being from notifying the forward-end message pool of the disposition of the messages. If the sixth message is processed successfully, then the message forwarding intermediary may notify the forward-end message pool of the disposition of all six messages as successfully processed (causing all six messages to be deleted by the forward-end message pool). If the sixth message is not processed successfully, then the message forwarding intermediary may notify the forward-end message pool that none of the six messages were successfully processed (causing all six messages to be unlocked by the forward-end message pool).

When processing multiple messages under a single transaction, the message forwarding intermediary may assign a processing identifier that is unique within the group of messages to be processed under the transaction. When the message forwarding intermediary is made aware of the results of processing of the message, this unique processing identifier may also be provided by the service instance, allowing the message processing identifying to correlate the results with the proper message.

This mechanism allows for messages to be processed in a transactional manner in a message intermediation environment, without requiring that the message forwarding intermediator create the transaction. Instead the service instance may create the transaction. Accordingly, the service instance may process some messages from a client outside of a transaction, and some inside a transaction.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. One or more physical computer-readable storage devices having stored thereon one or more computer-executable instructions that are structured such that, when executed by one or more processors of a computing system, cause the computing system to instantiate a message forwarding intermediary in one or more memories of the computing system, the message forwarding intermediary configured to do the following with respect to a message in a forward-end message pool;

an act of requesting a message from the forward-end message pool using a coordination pattern that causes the forward-end message pool to provide a non-destructive view of the contents of the requested message to the message forwarding intermediary and to lock the requested message in the forward-end message pool for exclusive access by the message forwarding intermediary until the message is once again unlocked;

an act of evaluating the message contents to identify that, of a plurality of service instances, a particular service instance is to process the message contents;

an act of dispatching the message contents towards a backward-end message pool corresponding to the particular service instance; and an act of signaling the forward-end message pool as to a disposition of the message based on determined results of processing of the message contents.

2. The one or more storage devices in accordance with claim 1, wherein the act of evaluating the message contents to identify that a particular service instance is to process the message contents comprises:

an act of identifying a plurality of candidate service instances that are capable of processing the message; and an act of selecting from among the plurality of candidate service instances a particular service instance based on the respective loads of the candidate service instances.

3. The one or more storage devices in accordance with claim 1, wherein the message forwarding intermediary is further configured to identify a stateful session corresponding to the message, and perform an act of affinitizing the stateful session to the particular service instance.

4. The one or more storage devices in accordance with claim 3, wherein the message forwarding intermediary performs the act of affinitizing the stateful session to the particular service instance using affinitization criteria received from the particular service instance.

5. The one or more storage devices in accordance with claim 1, the method further comprising determining results of processing of the message contents in the backward-end message pool by the particular service instance, wherein the act of dispatching the message further comprises an act of associating with the message a lease policy, and wherein the act of determining the results of processing the message further comprises an act of considering processing to have failed if the lease expires.

6. The one or more storage devices in accordance with claim 1, the method further comprising:

determining results of processing of the message contents in the backward-end message pool by the particular service instance, by determining results of processing the message contents further comprises an act of receiving a transaction flowed from the particular service instance, and wherein the act of signaling the forward-end message pool comprises an act of deleting the message from the forward-end message pool using the flowed transaction.

7. The one or more storage devices in accordance with claim 6, wherein the forward-end message pool is a transaction-enabled message queue.

8. The one or more storage devices in accordance with claim 6, wherein the forward-end message pool is not transactionally-enabled and wherein the act of deleting the message from the forward-end message pool using the flowed transaction comprises:

an act of the message forwarding intermediary enlisting in the flowed transaction;

an act of the message forwarding intermediary determining that the flowed transaction is resolved successfully; and an act of non-transactionally deleting the message from the forward-end message pool.

9. The one or more storage devices in accordance with claim 1, the method further comprising:

determining results of processing of the message contents in the backward-end message pool by the particular service instance by determining that the particular service instance did not process the message contents successfully; and wherein the act of signaling the forward-end message pool comprises an act of unlocking the message.

10. The one or more storage devices in accordance with claim 1, wherein the act of evaluating the message contents to identify that a particular service instance is to process the message contents comprises:

an act of determining that there is not yet a service instance instantiated for processing the message contents; and wherein the act of dispatching the message contents comprises an act of causing the particular service instance to be instantiated.

11. The one or more storage devices in accordance with claim 1, wherein the requested message is a first requested message, and wherein the message forwarding intermediary is configured to further perform:

an act of requesting one or more additional messages from the forward-end message pool using the coordination pattern that causes the forward-end message pool to provide a non-destructive view of the contents of each message of the one or more additional messages to the message forwarding intermediary and to lock the requested one or more additional messages in the forward-end message pool for exclusive access by the message forwarding intermediary;

an act of dispatching the contents of the one or more additional messages towards the backward-end message pool corresponding to the particular service instance;

an act of determining results of processing the one or more additional message contents in the backward-end message pool by the particular service instance; and an act of signaling the forward-end message pool as to the disposition of the one or more additional messages based on the determined results of processing the one or more message contents.

12. The one or more storage devices in accordance with claim 11, wherein if for any one of the first message or one or more additional messages, the determined service instance did not process the message contents successfully, the message forwarding intermediary handles all of the messages as if the determined service instance did not process the message contents successfully.

13. The one or more storage devices in accordance with claim 11, wherein the act of dispatching the message contents for each of the group of messages including the first message and the one or more additional messages, further includes an act of assigning each message a processing identifier unique within the group of messages; and wherein the act of determining results of processing each message contents further includes an act of receiving one or more processing identifiers along with the dispositions of each of the processed message contents.

14. The one or more storage devices in accordance with claim 13, wherein, for each of the first message and the one or more additional messages, the act of determining results of processing message contents further includes an act of receiving one or more transactions flowed from the particular service instance along with an associative mapping between one or more of the processing identifiers and one or more of the flowed transactions; and wherein, for each of the first message and the one or more additional messages, the act of signaling the forward-end message pool comprises an act of deleting the message from the forward-end message pool using the flowed transaction indicated by the associative mapping.

15. The one or more storage devices in accordance with claim 1, wherein requesting a message from the forward-end message pool using a coordination pattern comprises requesting a message from a forward-end peek-lock enabled message pool using a peek-lock coordination pattern.

16. The one or more storage devices in accordance with claim 1, wherein, in response to the act of requesting the message from the forward-end message pool using the coordination pattern, the forward-end message pool provides a view of the contents of the requested message to the message forwarding intermediary.

17. The one or more storage devices in accordance with claim 1, wherein, in response to the act of requesting the message from the forward-end message pool using the coordination pattern, the forward-end message pool locks the requested message in the forward-end message pool for exclusive access by the message forwarding intermediary.

18. The one or more storage devices in accordance with claim 1, wherein, subsequent to the act of dispatching the message contents towards a backward-end message pool corresponding to the particular service instance, the particular service instance accesses a view of contents of the message from the backward-end message pool using the coordination pattern.

19. A method for a service instance to process a version of a message from a backward-end message pool, the method comprising:
    an act of a service instance requesting a version of a message from a backward-end message pool using a coordination pattern that causes the backward-end message pool to provide a non-destructive view of the contents of the requested version of the message to the service instance and to lock the requested version of the message in the backward-end message pool for exclusive access by the service instance until the version of the message is once again unlocked, wherein the message also exists in a forward-end message pool, the version of the message in the forward-end message pool having been locked in the forward-end message pool by a message forwarding intermediary requesting the message using the coordination pattern;
    an act of the service instance processing the message contents;
    an act of the service instance determining results of the processing of the message contents; and
    an act of the service instance signaling the backward-end message pool as to the disposition of the version of the message based on the determined results of processing of the contents of the version of the message.

20. The method in accordance with claim 19, wherein the act of processing the message contents comprises:
    an act of determining that the contents of the version of the message are to be accomplished within a transaction;
    an act of processing the contents of the version of the message within the transaction,
    an act of determining that the contents of the version of the message were accomplished successfully; and
    an act of deleting the version of the message from the backward-end message pool using the transaction.

21. The method in accordance with claim 20, wherein the act of signaling the message forwarding intermediary of results of processing the message contents in the backward-end message pool comprises:
    an act of flowing the transaction to the message forwarding intermediary.

22. The method in accordance with claim 20, wherein the acts of processing, determining, signaling the message forwarding intermediary and signaling the backward-end message pool are performed for a plurality of messages in the backward-end enabled message pool.

23. The method in accordance with claim 22,
    wherein each of the plurality of messages are to be performed as part of a single transaction,
    wherein the act of signaling the message forwarding intermediary of results of processing the message contents in the backward-end enabled message pool comprises an act of signaling the message forwarding intermediary that the message contents were not successfully processed if any of the plurality of messages could not be processed.

24. The method in accordance with claim 20, wherein requesting a version of a message from the backward-end message pool using a coordination pattern comprises requesting a version of a message from a backward-end peek-lock enabled message pool using a peek-lock coordination pattern.

25. The method in accordance with claim 19, wherein the message forwarding intermediary signals the forward-end message pool as to the disposition of the message based on the results of processing of the message contents signaled by the service instance.

* * * * *